July 13, 1965

B. CATANIA 3,195,060

AMPLITUDE DETECTING DEVICE

Filed Oct. 17, 1962

INVENTOR.
BASILIO CATANIA
BY C. A. Gulbrandsen
ATTORNEY

July 13, 1965  B. CATANIA  3,195,060
AMPLITUDE DETECTING DEVICE
Filed Oct. 17, 1962  2 Sheets-Sheet 2

INVENTOR.
BASILIO CATANIA
BY C. A. Gulbrandsen
ATTORNEY

United States Patent Office 3,195,060
Patented July 13, 1965

3,195,060
AMPLITUDE DETECTING DEVICE
Basilio Catania, Milan, Italy, assignor to
Marelli Lenkurt S.p.A.
Filed Oct. 17, 1962, Ser. No. 231,188
Claims priority, application Italy, Oct. 20, 1961,
19,037/61
2 Claims. (Cl. 329—192)

The present invention relates to amplitude detecting devices.

As is known, amplitude detectors are characterized by the employment of a non linear element to which is applied a signal with an amplitude varying in time. According to the type of detector (crest or maximum value detector, mean value detector, etcetera), it is possible to detect particular values of amplitude, such as the maximum value, the mean value or some other, reached in a particular interval of time.

The current (or voltage) generated by the non linear element contains a so-called component of detection, which reproduces, more or less faithfully, the magnitude desired (maximum value, mean value, or some other), and which is to be separated from the other components, and, if necessary, amplified to a given level.

The principal requirements of a detector are efficiency and fidelity in the detection, or the proportionality of the detection current (or voltage) to the value to be detected (maximum value, mean value or other). It is also desirable that the signal to be detected require the lowest possible power.

In conventional detectors, and in particular in detectors of peak values or mean values, it is known that an increase in the load resistance gives rise, other conditions being equal, to an improvement in the efficiency of the detection, to an almost static linearity (fidelity at the low frequency components of the modulating signal), and at the same time, to a diminution of the power required for the signal to be detected.

On the contrary, a reduction in the value of this resistor improves the response of the detector to rapid transients (and consequently the fidelity of the response to the high frequency components of the modulating signal) which is greater in proportion as the capacitances shunting the said resistor are greater.

In addition, it must be borne in mind that the choice of the value of the above mentioned resistor is dependent on some of the characteristics of the circuit following the detector (generally an amplifier), such as its equivalent input impedance or the maximum derivable resistance in the said input.

In view of this, we end by adopting in practice a compromise value of load resistance, accepting of course, degradations of quality of one kind or another, or else we have recourse to compensations in the output signal from the detector.

The object of the present invention is that of improving the performance of detectors, and in particular the linearity, the efficiency of the detection, and the response to rapid transients, as well as to reduce the absorption of the strength of the signal to be detected, without having recourse to compensations which are generally the cause of instability.

According to the invention, these advantages are obtained by coupling the detector circuit to an amplifier, and carrying the output signal of the said amplifier back to its input with an opposite polarity with respect to that of the input signal to the said amplifier.

The negative feedback amplitude-detecting device thus obtained acts so that there is presented to the detector circuit, an equivalent load impedance which is proportionately greater, accordingly as the gain of the amplifier is greater. In particular, when the said gain increases, the equivalent resistance presented to the detector increases, it being possible, in consequence, to reach resistance values greater than those obtainable as compromises in conventional detectors. To such an increase in resistance corresponds, as stated, a more efficient detection, better linearity, and a lower power requirement.

Another consequence of the impedance increase obtained lies in the diminution of the equivalent capacity presented to the detector, which constitutes an advantage for the detection of high speed transients (fidelity at high frequencies).

Further features and advantages of the invention will be now described, solely by way of example, with reference to the appended drawings, in which:

The FIGURE 1 is a schematic representation of the principle of a detecting device utilizing a non linear element constituted of a bipole and a voltage amplifier according to the invention;

Figure 1:
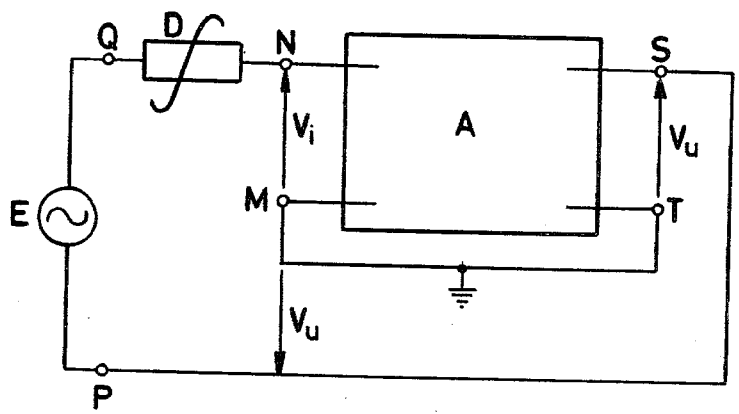

In the schematic of the FIGURE 1, E indicates the generator which furnishes the signal to be detected, with Q one of the terminals, connected to the non linear element D, and with P the other terminal, connected to the output terminal S of the amplifier A.

The non linear element D, on the side not connected to the generator, is connected to the input terminal N of the amplifier A.

The said amplifier is identified with the input terminals N and M, through which is presented the voltage $Vi$, and with the output terminals S and T, through which is presented the voltage $Vu$.

The output terminal T and the input terminal M of the amplifier A are connected directly together, and kept apart from the rest of the circuit.

With such a circuit arrangement, typical of the negative feedback construction, it is obvious that the amplifier is employed as a bipole, since it is connected to the rest of the circuit only through the terminals N and S. The impedance offered by the amplifier through the terminals N and S or, which is the same thing, through N and P, is, as shown for example by Bode's "Network Analysis and Feedback Amplifier Design" (Van Nostrand, 1959, page 73, Effect of Feedback on Input and Output Impedances of Amplifiers), notably higher than that normally offered across the input terminals N and M, provided there is a proper amplification between input and output, and which is of such a sign as to make the output voltage $Vu$ in phase opposition with the amplifier input $Vi$, that is (see the figure):

$$\frac{Vu}{Vi} < 0$$

This phase opposition should occur only in the range of frequencies occupied by the modulating signal, in the case where the detector is of the maximum value type, while for detectors of the mean value type the phase opposition should take place also for the carrier and its side bands.

The amplifier A, which fulfills primarily the function of an impedance raiser, is not required to have any particular gifts of linearity, since the negative feedback tends to neutralize the distortions of the amplifier. This can be determined, in a first approximation, by assuming the detector D constituted of an ideal diode (that is, similar to an open circuit for negative voltages and to a short-circuit for positive voltages); in such a case it would occur that the output current of the detector D would have a component exactly proportional to the difference between the positive envelope of the signal furnished by the generator E and the output signal V$u$, in a manner almost identical with what we would have if the amplifier A had its own negative feedback.

In this connection, it is well to bear in mind that in cases in which a negative feedback amplifier is already present, as is often necessary with stringent requirements of linearity, slight circuit modifications are sufficient, in order to obtain the advantages of the present invention practically without cost penalty. These modifications consist in inserting the detector and the amplifier in a single negative feedback loop, in accordance with the arrangement illustrated in the figure, and in revising the stabilization circuit of the amplifier, in relationship with the new conditions of stability in the system.

In the figure the generator E represents a generic source for applying the signal to the detecting device, and therefore the generator may be constituted for example of the output stage of an amplifier, of the secondary of a transformer, of a line terminating circuit, etcetera.

The non linear element D may be a vacuum diode or a crystal diode, or any other bipole of the non linear type.

Figure 3:
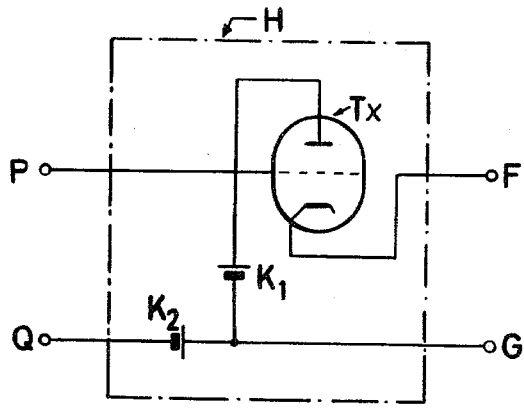
FIGURE 3 shows schematically a practical construction of the non linear bipole of the FIGURE 2.

As a more general case, this non linear element could be constituted of a double bipole, for example like that shown in the FIGURE 3, and cited in the article by Robert Magnusson: "Sensitive Group Delay Meters," in "Ericsson Technics," No. 1, 1957, page 133: "Detector."

Figure 2:
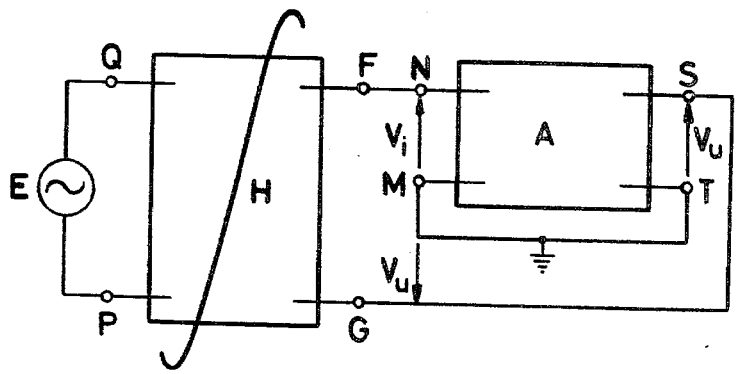
FIGURE 2 is a schematic representation of the principle of the device of the FIGURE 1, in which a double bipole is employed as the non linear element.

A detecting device thus constructed comes within the schematic representation of the principle of the device as shown in the FIGURE 2, in which the detector H, generically represented as a double bipole, is connected by the terminals P and Q to the generator E, while the load constituted of the amplifier A, whose internal connections are exactly those of the FIGURE 1, is bridged across the output terminals F and G.

If the detector constituted of the double bipole H possesses, as occurs with cathode follower detectors, the property of requiring high values of secondary load impedance to be able to furnish better performance (or efficiency, linearity, etc.), it is evident how the advantages of the present invention will be retained also for this case.

As to that which concerns the linearity requirements of the amplifier, what is said above holds, that is, the negative feedback acts in a sense to attenuate the distortion of the amplifier, provided that inside of the detector H there exists the possibility of comparison between the detected signal and the envelope of the signal to be detected.

In the schematic of the FIGURE 3 the detector H is constructed of an electronic tube T connected as a cathode follower; P. Q and F. G represent respectively, the input and output terminals. The terminal P is formed of the control grid of the tube T and the terminal F of the cathode, while the plate is brought out through the plate battery $K_1$ to the terminal G; finally, the battery $K_2$ is inserted between the terminal G and the terminal Q for the negative biasing of the grid circuit. In operation, the tube is biased to cutoff in such a way that its static characteristic (cathode current as a function of the voltage between grid and cathode) will be as close as possible to that of an ideal diode, that is to say, will present very small currents for grid-cathode voltages that are more negative than the biasing voltage, and high currents for voltages that are less negative; in other words, the detector now being described differs from that made with a bipole in FIGURE 1 essentially by the fact that the power is furnished by the plate battery $K_1$ rather than by the generator (E) of the signal to be detected.

All of the advantages of the present invention are accordingly retained for this detector, when it is inserted in accordance with the schematic of the FIGURE 2.

Figure 4:
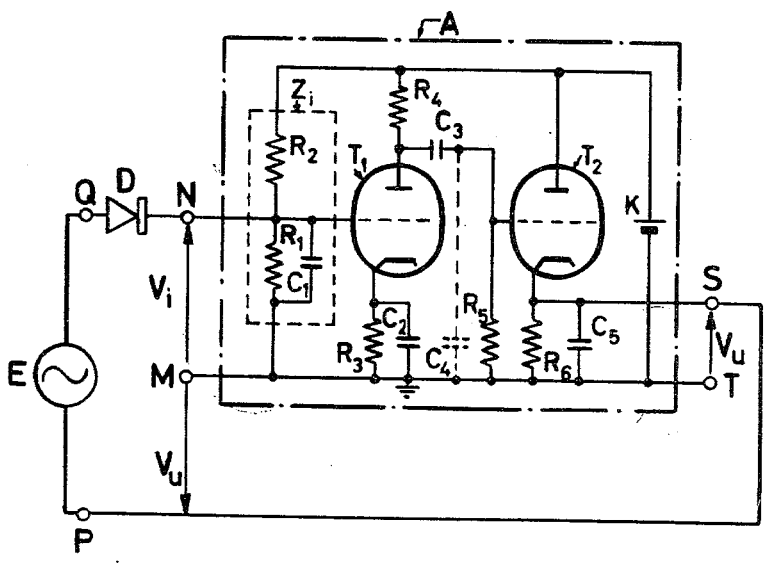
FIGURE 4 shows, in its essentials, a practical construction of the schematic representation of the FIGURE 1, with reference to a crest detecting device for video signals.

In the FIGURE 4, which as stated, represents a practical solution of a crest detecting device for amplitude modulated waves carrying video signals, the parts corresponding to those of the schematic of the FIGURE 1 are indicated by the same symbols.

The incoming signal to be detected is furnished by the generator E, which is inserted between the output S of the amplifier A and the terminal Q of the detector D, constituted in this case of a diode. The video amplifier, to which this diode is connected, has an input impedance $Z_1$ across the terminals M and N, constituted of the resistor $R_1$ in parallel with the condenser $C_1$ and also with the resistor $R_2$, it being assumed that in practice the internal resistance of the direct current source K will be negligible.

The electronic tube $T_1$ amplifies the signal presented at the input $N-M$ and, through the plate circuit $R_4$, $C_3$, $C_4$, $R_5$, passes it on to the output cathode follower $T_2$, which finally transfers the said signal to the resistor $R_6$ and the condenser $C_5$, thus furnishing the negative feedback voltage to the terminals S and T to be carried back to the generator E.

The values of the resistor $R_3$ and of the condenser $C_2$ are chosen so as to make the circuit stable with respect to firing.

The presence of the resistor $R_2$ has the sole purpose of correctly biasing the diode D.

The gain of the amplifier is quite high in the range of frequencies from about ten cycles to several megacycles, that is, in the video band, while it tends to zero at low modulating frequencies on the one hand, and for the whole range of frequencies occupied by the carrier and its side bands, on the other hand.

In other words, the detector sees, in the case in question, a load equal to $Z_1$ for the carrier and its side bands, as well as for the detection direct current; it sees on the contrary, an increased load with respect to $Z_1$, and precisely $Z_1(1+G)$, with $G=-V_u/V_1$ being the gain of the amplifier, for the components of the detected signal having frequencies included within the video band.

The examples of construction described above refer to particular cases, but it will be obvious that all possible extensions and variants will come within the scope of the invention. Thus, it is clear that in the schemes cited, the circuits with electronic tubes may be replaced by circuits using transistors, in which case the present invetnion will find its best employment, due to the fact that the input impedance of transistors is in general lower than that presented by electronic tubes, and consequently, the need for raising such impedance will be less felt, when the signal furnished by a detector is to be amplified by transistors.

Further more, the modulating signal may be of any kind, and therefore, besides the television signal, it may be a question of a telephone multiplex signal, of a musical signal, or directly of a direct current signal, as occurs for the detectors contained in vacuum tube voltmeters for alternating voltages. In other words, the signal to be detected may be modulated in amplitude in the most general manner, and in particular, it may be constant in time.

Finally, it may be noted that in the foregoing we have spoken of voltage generators, and voltage amplifiers, but, obviously, it is possible to construct a device fully analogous to those examined, in which currents are manipulated rather than voltages, as occurs in the case of dual circuits of those described.

What is claimed is:
1. An amplitude detecting device including a nonlinear element, an amplifier having a pair of input and a pair of output terminals, an input signal generator coupled to the input of the element, a connection from one side of the generator through said element to one terminal of the input of the amplifier, another connection from the other side of the generator to one of the output terminals of the amplifier, a circuit connection the other terminal of the input of the amplifier to the other output terminal of the output circuit of the amplifier, said latter circuit between an input terminal and said other output terminal being isolated from the remainder of the circuit, whereby the output signal from the amplifier is carried back to the input of the amplifier in opposite polarity with respect to the input signal.

2. An amplitude detecting device such as claimed in claim 1 in which said one side of the generator is connected through the non-linear element to one side of the input of the amplifier, and in which the corresponding side of the output circuit of the amplifier is connected to the other side of the generator, thereby permitting a reduction in the distortion of the amplifier.

References Cited by the Examiner

UNITED STATES PATENTS

| | | | |
|---|---|---|---|
| 2,157,856 | 5/39 | Koch | 329—192 |
| 2,286,337 | 6/42 | Bruck | 329—192 |
| 2,315,442 | 3/43 | McRae | 329—192 |

ROY LAKE, *Primary Examiner.*